United States Patent
Wang et al.

(10) Patent No.: US 7,095,631 B2
(45) Date of Patent: Aug. 22, 2006

(54) SWITCHING POWER CONVERTER

(75) Inventors: Po-Wen Wang, Shindian (TW);
Chia-Tse Yeh, Jhongli (TW);
Chien-Kun Huang, Taipei (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 11/104,480

(22) Filed: Apr. 13, 2005

(65) Prior Publication Data

US 2005/0231984 A1    Oct. 20, 2005

(30) Foreign Application Priority Data

Apr. 19, 2004   (TW)   ................. 93110892 A

(51) Int. Cl.
*H02M 3/335*    (2006.01)
(52) U.S. Cl. ..................... 363/16; 363/21.12
(58) Field of Classification Search .............. 363/16, 363/18, 19, 20, 21.01, 21.12, 21.14, 131
See application file for complete search history.

(56) References Cited

U.S. PATENT DOCUMENTS

| | | | | |
|---|---|---|---|---|
| 4,866,587 A * | 9/1989 | Wadlington | .................. | 363/16 |
| 5,109,326 A * | 4/1992 | Martin, Jr. | ................ | 363/21.14 |
| 5,594,629 A * | 1/1997 | Steigerwald | ............. | 363/21.14 |
| 5,719,755 A * | 2/1998 | Usui | ........................... | 363/19 |
| 6,069,804 A * | 5/2000 | Ingman et al. | ........... | 363/21.14 |
| 6,650,550 B1 * | 11/2003 | Wittenbreder, Jr. | .......... | 363/16 |
| 6,788,555 B1 * | 9/2004 | Bourdillon et al. | ...... | 363/21.14 |
| 6,995,991 B1 * | 2/2006 | Yang et al. | .............. | 363/21.14 |

\* cited by examiner

*Primary Examiner*—Adolf Berhane
(74) *Attorney, Agent, or Firm*—Rabin & Berdo, P.C.

(57) ABSTRACT

A switching power converter for converting an AC power into a DC power. The converter includes a transformer, a charge storage unit, a synchronization signal generator, and a switch element. The transformer includes a primary side coil and a secondary side coil, and the primary side coil generates an induced voltage at the secondary side coil according to AC power. The charge storage unit charges according to the induced voltage and outputs a DC power. The synchronization signal generator generates a synchronization signal according to the induced voltage. The synchronization signal is the first value when the induced voltage is positive and is the second value when the induced voltage is negative. The switch element, serially connected to the secondary side coil and controlled by the synchronization signal, is turned on when the synchronization signal is the first value and is turned off when otherwise.

20 Claims, 7 Drawing Sheets

US 7,095,631 B2

SWITCHING POWER CONVERTER

This application claims the benefit of Taiwan application Serial No. 93110892, filed Apr. 19, 2004, the subject matter of which is incorporated herein by reference.

BACKGROUND OF THE INVENTION

1. Field of the Invention

The invention relates in general to a switching power converter, and more particularly to an efficiency-enhancing switching power converter.

2. Description of the Related Art

Switching power converter, which is for rectifying an AC power and then outputting a DC power, is widely applied in electronic devices. FIG. 1 is a circuit diagram of conventional switching power converter 100. Switching power converter 100 includes a transformer, resistors R1, R2, R3, R4, R5, R7, R8 and R14, diodes D2, D3 and D14, capacitors C1, C3 and C22, an inductor L5, and a transistor M1. The transformer includes a primary side coil L1 and a secondary side coil L3. The switching power converter 100 rectifies a power Vb+ according to control signal Vin and outputs a DC power Vo. The diode D14 is electrically connected to the secondary side coil L3 for rectifying.

Considering worldwide energy specification and consumers' demands, energy saving and power efficiency enhancing have become urgent goals for the manufacturers of electronic devices to achieve. Besides, if power consumption can be reduced, temperature of electronic device will be reduced as well.

However, when the diode D14 is used to rectify, the efficiency of the switching power converter 100 cannot be good. Given that the output voltage Vo is 3.3V and that the diode D14 is a Schotty diode, the forward voltage of the diode D14 is 0.7V, and the efficiency of switching power converter 100 is 3.3/(3.3+0.7)=82.5%. Given that the output voltage Vo is 12V and that the diode D14 is an ultra-fast diode, the forward voltage of the diode D14 is 0.95V, and the efficiency of the switching power converter 100 is 12/(12+0.95)=92%.

SUMMARY OF THE INVENTION

It is therefore an object of the invention to provide an efficiency-enhancing switching power converter.

The invention achieves the above-identified object by providing a switching power converter for receiving an AC power then outputting a DC power accordingly. The converter includes a transformer, a charge storage unit, a synchronization signal generator, and a switch element. The transformer includes a primary side coil and a secondary side coil, and the primary side coil generates the induced voltage at the secondary side coil according to the AC power. The charge storage unit, coupled to the secondary side coil, charges according to the induced voltage then outputs a DC power. The synchronization signal generator generates a synchronization signal according to the induced voltage. When the induced voltage is positive, the synchronization signal is the first value, and when the induced voltage is negative, the synchronization signal is the second value. The switch element, serially connected to the secondary side coil and controlled by the synchronization signal, is turned on when the synchronization signal is the first value and is turned off when otherwise.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
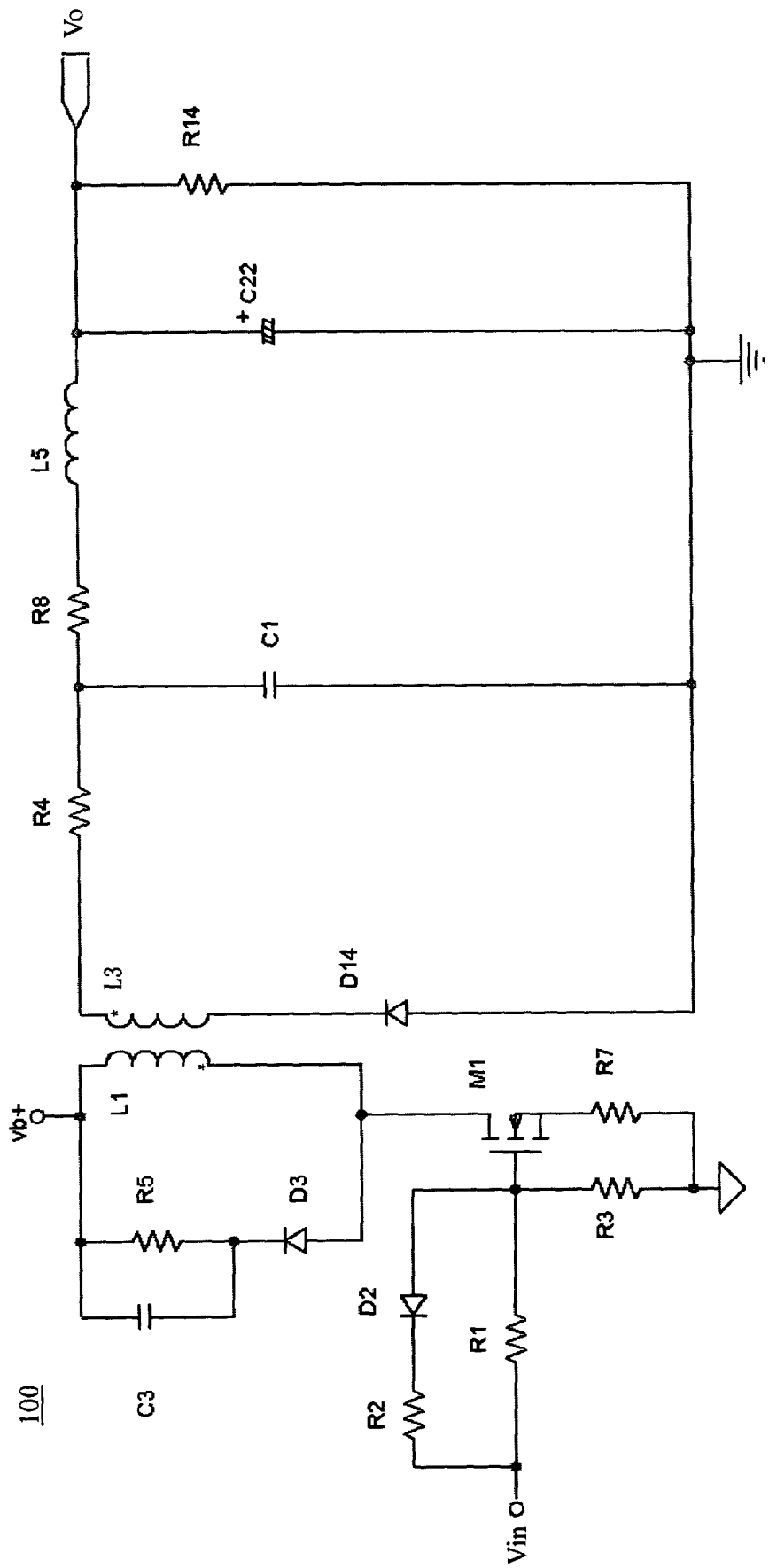
FIG. 1 is a circuit diagram of a conventional switching power converter.
Figure 2A:
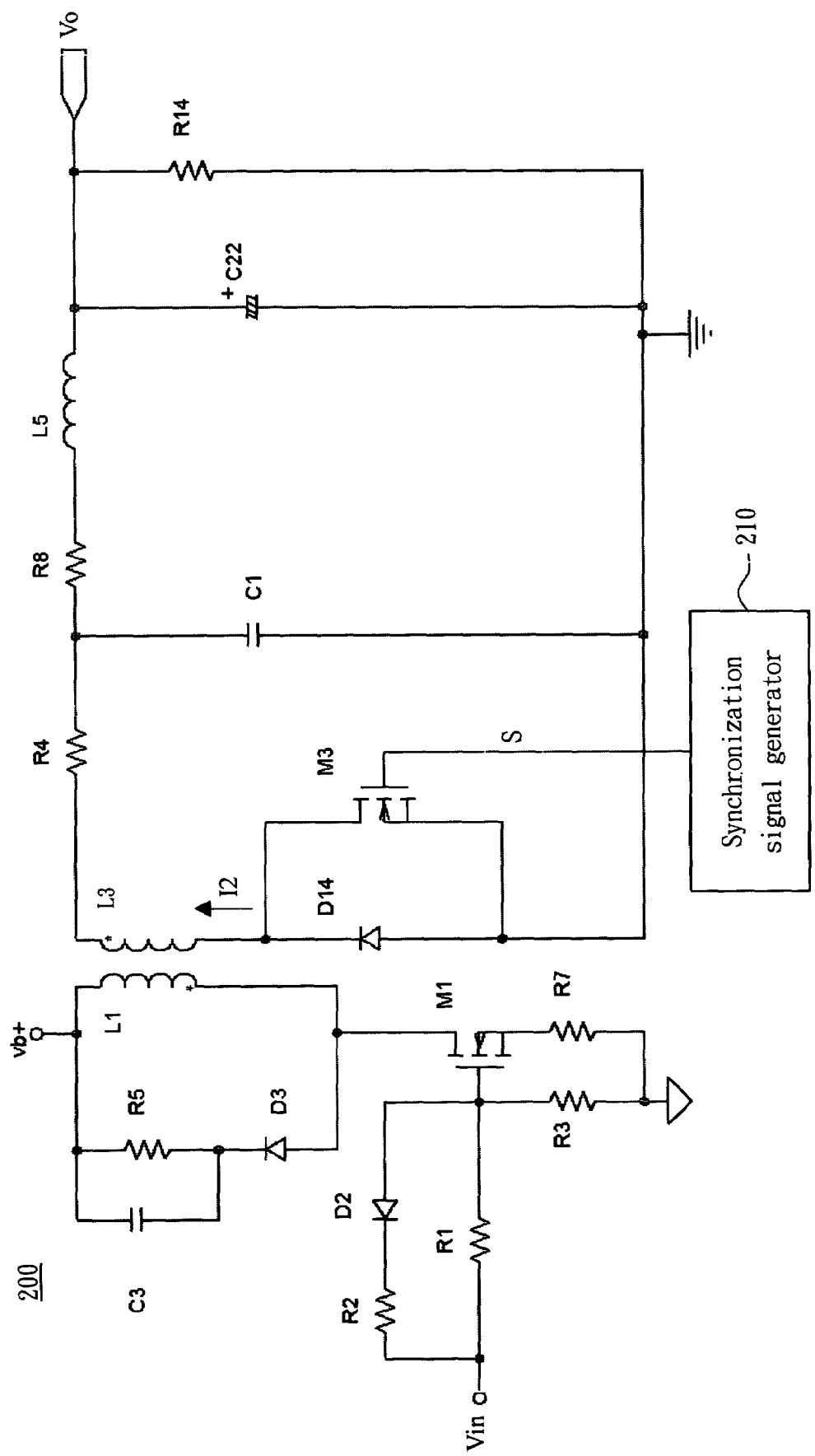
FIG. 2A is a circuit diagram of a switching power converter according to preferred embodiment one of the invention.

Referring to FIG. 2A, a circuit diagram of a switching power converter 200a according to a first embodiment of the invention is shown. Switching power converter 200 includes a transformer, resistors R1, R2, R3, R4, R5, R7, R8, and R14, diodes D2, D3, and D14, capacitors C1, C3, and C22, an inductor L5, transistors M1 and M3 and a synchronization signal generator 210. The transformer includes a primary side coil L1 and a secondary side coil L3. The transistor M3, connected in parallel with the diode D14, is controlled by the synchronization signal S generated by the synchronization signal generator 210. The transistors M1 and M3 can be replaced with other switch elements.

Figure 2B:
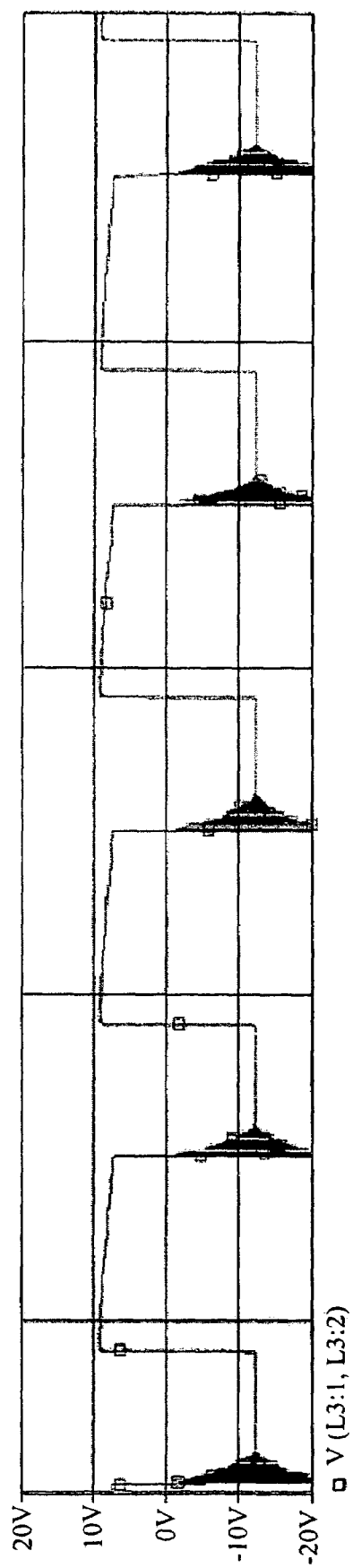
FIG. 2B is a voltage wave diagram of secondary side coil L3.
Figure 2C:
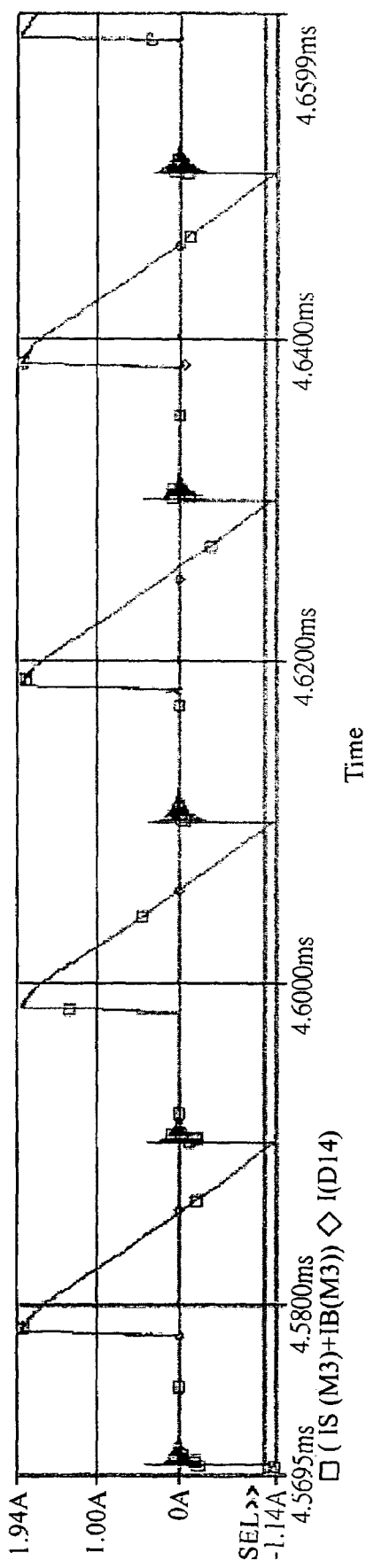
FIG. 2C is a wave diagram of current I2.

FIG. 2B is a voltage wave diagram of secondary side coil L3, while FIG. 2C is a wave diagram of current I2. When the voltage of the secondary side coil L3 is positive, the synchronization signal S generated by the synchronization signal generator 210 is high level for the transistor M3 to be turned on; when the voltage of the secondary side coil L3 is negative, the synchronization signal S generated by the synchronization signal generator 210 is low level for the transistor M3 to be turned off. The invention achieves rectification of power current by controlling the transistor M3 to be turned on/off.

Take the IRFZ44 specification for example, when the transistor M3 is turned on, the value of the resistor Rds-on is approximately 0.0165 Ω. When switching power converter 200 has an output voltage of 3.3V and a load current of 1A, the conversion efficiency is 3.3/(3.3+0.0165×1)=99.5%. When switching power converter 200 has an output voltage of 12V and a load current of 1.5A, the conversion efficiency is 12/(12+0.0165×1.5)=99.8%. Since the transistor M3 has a small resistance when turned on, the conversion efficiency is much better off than that in a conventional switching power converter.

When the transistor M3 is turned on, the capacitors C1 and C22 will begin charging, the current flowing through the transistor M3 will become smaller as shown in FIG. 2C. When the current flowing through the transistor M3 has been reduced to 0, the voltage of the secondary coil L3 is still positive, so the transistor M3 remains turned on for the current to turn negative. That is to say, the reverse current will reduce energy efficiency but is still outdo the conventional switching power converter.

Figure 3A:
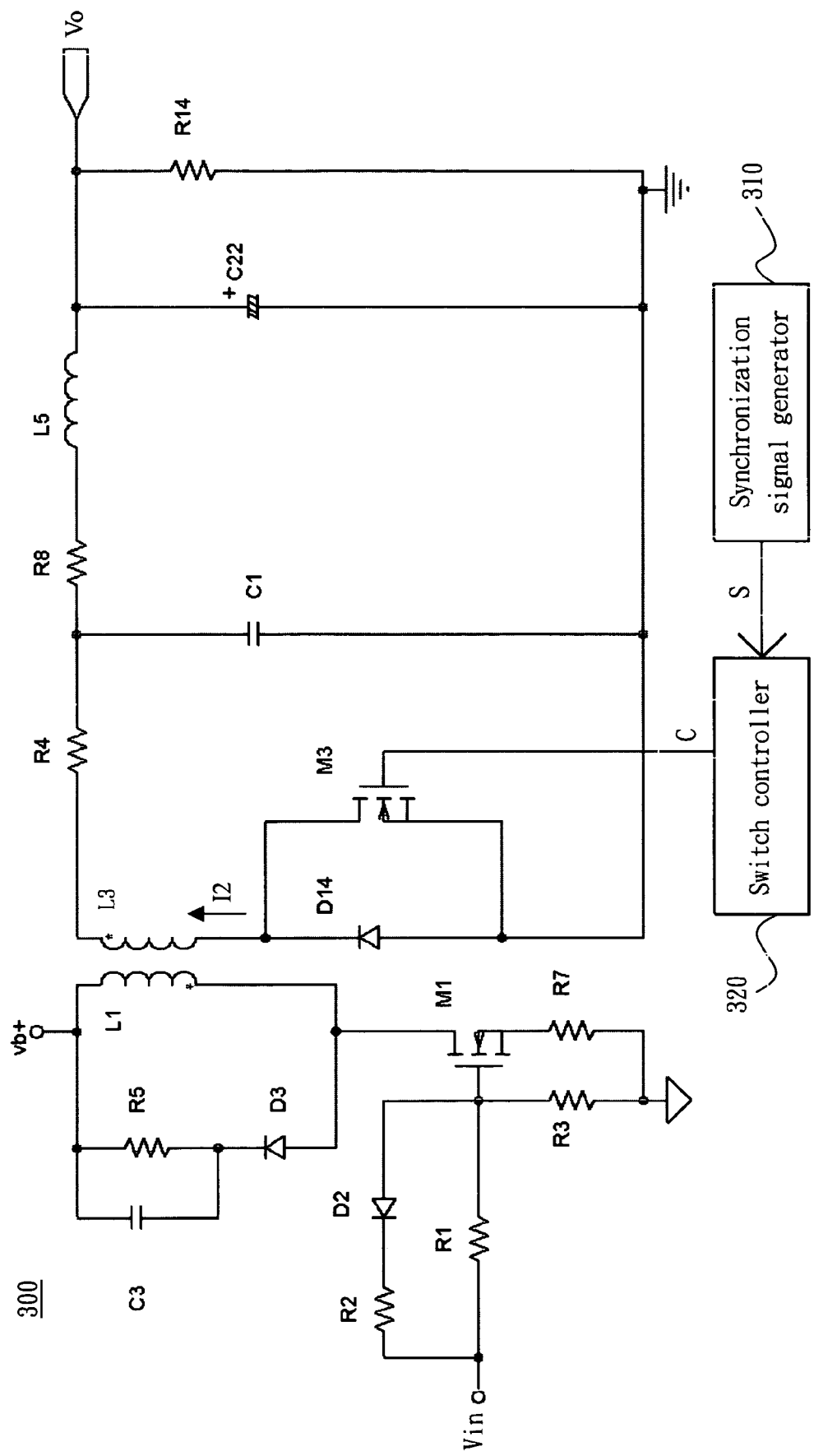
FIG. 3A is a circuit diagram of a switching power converter according to a second embodiment of the invention.

Referring to FIG. 3A, a circuit diagram of a switching power converter according to preferred embodiment two of the invention is shown.

Switching power converter 200 includes a transformer, resistors R1, R2, R3, R4, R5, R7, R8, and R14, diodes D2, D3, and D14, capacitors C1, C3, and C22, an inductor L5, transistors M1 and M3, a synchronization signal generator 310 and a switch control circuit 320. The transformer includes a primary side coil L1 and a secondary side coil L3. The transistor M3 and the diode D14 are connected in parallel. The synchronization signal generator 310 outputs the synchronization signal S to the switch controller 320 according to the voltage of the coil L3. The switch controller 320 generates a control signal C according to the synchronization signal S to control the transistor M. The transistors M1 and M3 can be replaced with other switch elements.

Figure 3B:
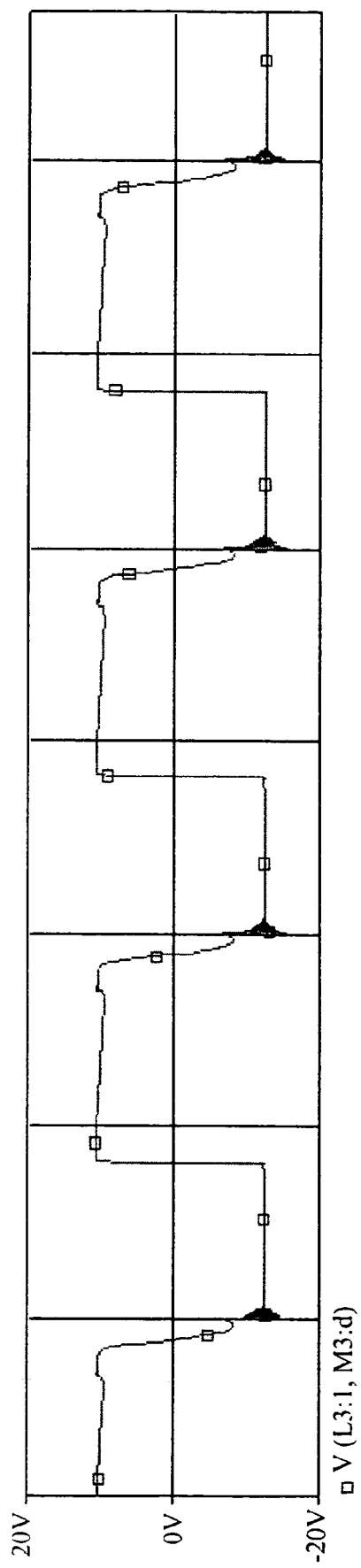
FIG. 3B is a voltage wave diagram of the secondary side coil L3.
Figure 3C:
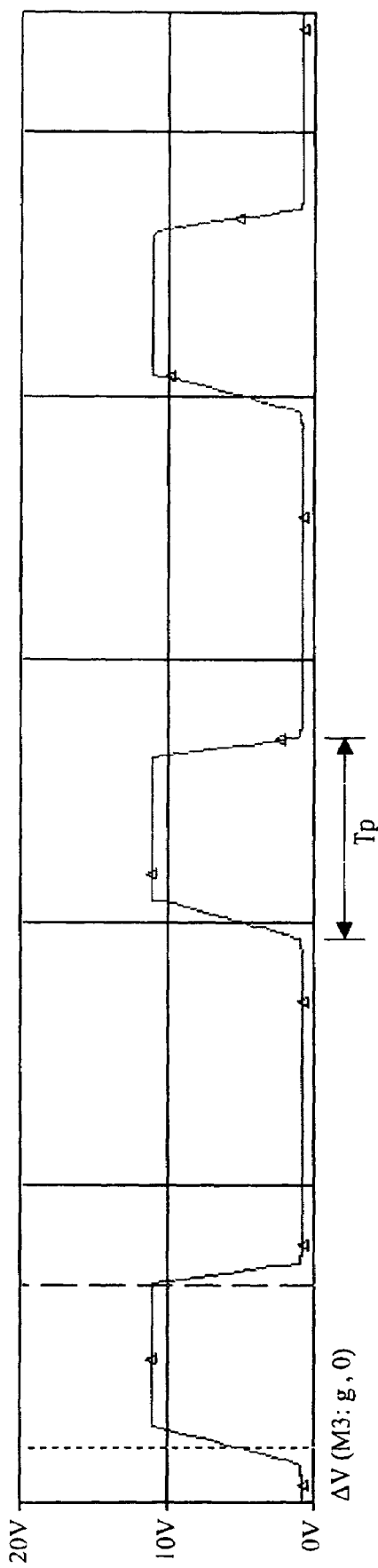
FIG. 3C is a wave diagram of control signal C.
Figure 3D:
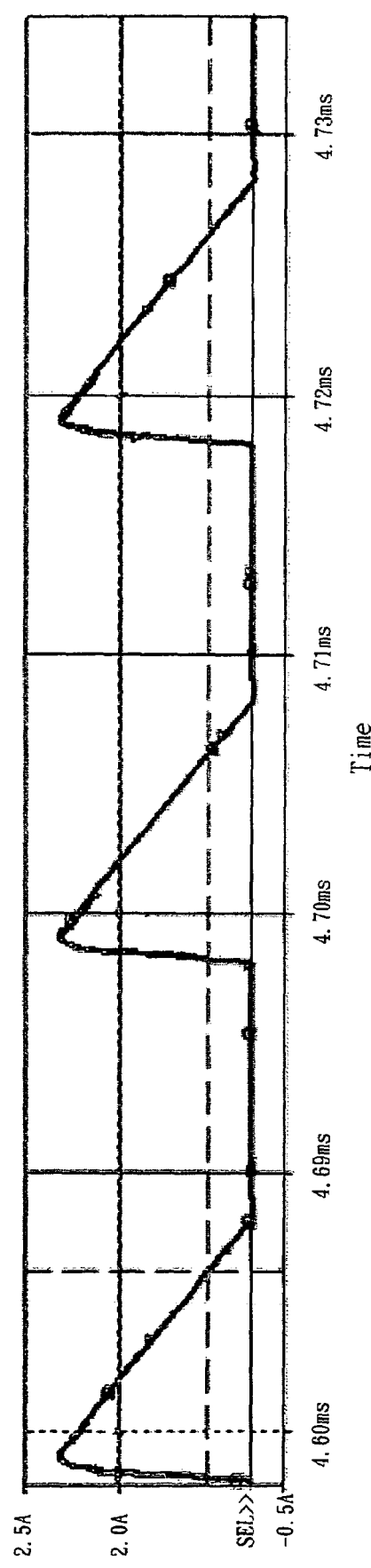
FIG. 3D is a wave diagram of current I2.

FIG. 3B is a voltage wave diagram of secondary side coil L3, while FIG. 3C is a wave diagram of control signal C, while FIG. 3D is a wave diagram of current I2. When the voltage of the secondary side coil L3 is positive, the control signal C enables the transistor M3 to be turned on, and the capacitors C1 and C22 begin charging. When the capacitors C1 and C22 have been fully charged, i.e., after a predetermined time Tp, the control signal C will be converted to low level for the transistor M3 to be turned off, not only achieving rectification but also preventing reverse current problem disclosed in preferred embodiment one. In FIG. 3D, before the transistor M3 is activated by the control signal C and before the voltage of the coil L3 turns positive, the current I2 flows through the diode D14; after transistor M3 is turned on, most current I2 will flow through the transistor M3. After the capacitors C1 and C22 are charged to a saturated state, the control signal C will be reduced to low level for the transistor M3 to be turned off.

Figure 4:
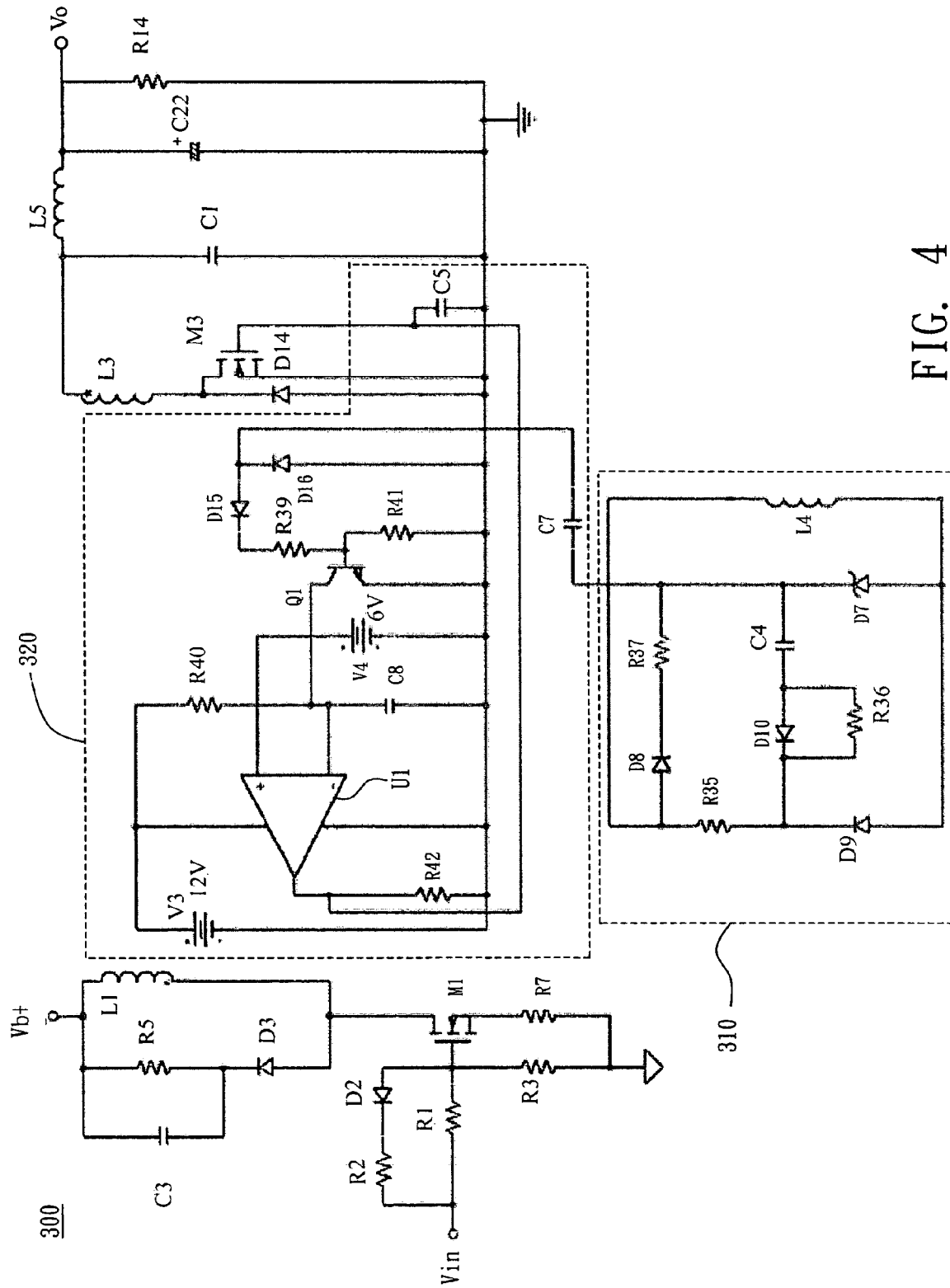
FIG. 4 is a circuit diagram of switching power converter according to the second embodiment.

FIG. 4 is a circuit diagram of switching power converter of the second embodiment. The synchronization signal generator 310 includes resistors R35, R36, R37, capacitors C4, C7, diodes D7, D8, D9 and D10. The synchronization signal generator 310 generates the synchronization signal S according to another secondary side coil L4 of the transformer, so that when the voltage of the coil L4 turns positive from negative, the synchronization signal S is high level, but is converted to low level in a short time Δt.

In the synchronization signal generator 310, the diode D7 is zenor diode for clamping the voltage outputted by the synchronization signal S. The diode D8, the resistors R35, R37 and the capacitor C4 comprise a positive half cycle processing circuit for processing the positive half cycle of the signal outputted by the coil L4. The diodes D9 and D10, the resistor R36 comprise a negative half cycle processing circuit for processing the negative half cycle of the signal outputted by coil L4.

The switch controller 320 includes voltage sources V3 and V4, a transistor Q1, an operating amplifier U1, resistors R39, R40, R41 and R42, capacitors C5 and C8, and diodes D15 and D16. In the present preferred embodiment, voltage sources V3 and V4 are respectively equal to 12V and 6V. The voltage sources V4 is coupled to the positive output end of the operating amplifier U1. When the synchronization signal S is low level, the transistor Q1 is turned off, so the voltage source V3 charges the capacitor C8. Meanwhile, the voltage of the negative input end of the operating amplifier U1 is larger than the voltage of the positive input end, so that the control signal C outputted by the operating amplifier U1 is low level, and that the capacitor C8 can be charged to the voltage of the voltage source V3 at maximum, i.e., 12V.

When the synchronization signal S is high level, the transistor Q1 is turned on, so the capacitor C8 can be discharged in an instant via the transistor Q1. After the capacitor C8 is discharged, the voltage of the capacitor C8 will be smaller than 6V, the voltage of the negative input end of the operating amplifier U1 will be smaller than the voltage of the positive input end, and the control signal C outputted by the operating amplifier U1 will be converted to high level for the transistor M3 to be turned on.

Since the synchronization signal S only remains at high level for a short time, Δt, then the synchronization signal S will be automatically converted to low level for the transistor Q1 to be turned off. After the transistor Q1 is turned off, the capacitor C8 will be charged via the resistor R40 and the voltage source V3. The RC circuit has a time constant, so that the required time for the capacitor C8 to be charged until having a voltage larger than 6V is a fixed value, i.e., a predetermined time Tp. After the predetermined time Tp, the voltage of the capacitor C8 is larger than 6V, the control voltage C outputted by the operating amplifier U1 is low level, so that the transistor M3 is turned off. With appropriate design and appropriate capacitor C8, resistor R40, the predetermined time Tp can be determined, so that the control signal C, which is converted to high level, will automatically be converted to low level, after the predetermined time Tp. Consequently, the reverse current problem in preferred embodiment one can be resolved.

The switching power converter disclosed in the above preferred embodiments of the invention enhances the efficiency of AC-to-DC conversion so as to achieve energy saving.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A switching power converter for receiving an AC power and then outputting a DC power, the converter comprising:
   a transformer comprising a primary side coil and a secondary side coil, wherein the primary side coil, according to the AC power, generates an induced voltage at the secondary side coil;
   a charge storage unit coupled to the secondary side coil, wherein the charge unit is charged by the induced voltage and then outputs the DC power;
   a synchronization signal generator generating a synchronization signal according to the induced voltage, wherein when the induced voltage is positive, the synchronization signal is a first value and when the induced voltage is negative, the synchronization signal is a second value;
   a switch controller generating a control signal according to the synchronization signal, wherein when the synchronization signal is changed from the second value to the first value, the control signal is changed to a first control value, and after a predetermined period of time, the control signal is changed to a second control value; and
   a switch element serially connected to the secondary side coil and controlled by the control signal, wherein when the control signal is the first control value, the switch element is turned on and when the control signal is the second control value the switch element is turned off.

2. The converter according to claim 1 further comprising a diode connected in parallel with the switch element.

3. The converter according to claim 1, wherein the secondary side coil further comprises an accessory coil having a first end and a second end, which is a grounding end, of which, the synchronization signal generator generates the synchronization signal according to an accessory signal outputted by the accessory coil.

4. The converter according to claim 3, wherein the synchronization signal generator further comprises a clamp circuit for clamping the magnitude of the synchronization signal.

5. The converter according to claim 4, wherein the clamp circuit is a zenor diode coupled between the output end and the grounding end of the synchronization signal generator.

6. The converter according to claim 5, wherein the synchronization signal generator comprises a positive half cycle processing circuit for processing the positive half cycle of the accessory signal.

7. The converter according to claim 6, wherein the positive half cycle processing circuit comprises:
a first diode whose positive end is coupled to the first end of the accessory coil and whose negative end is coupled to the output end of the synchronization signal generator;
a first capacitor whose first end is coupled to the output end of the synchronization signal generator;
a first resistor whose first end is coupled to the negative end of the first diode and whose second end is coupled to the first end of the first capacitor; and
a second resistor coupled between the negative end of the first diode and the second end of the first capacitor.

8. The converter according to claim 7, wherein the synchronization signal generator further comprises a negative half cycle processing circuit for processing the negative half cycle of the accessory signal, the negative half cycle processing circuit comprises:
a second diode coupled between the first capacitor and the first resistor, the positive end of the second diode is coupled to the first capacitor while the negative end of the second diode is coupled to the first resistor;
a third resistor connected in parallel with the second diode; and
a third diode whose negative end is coupled to the negative end of the second diode and positive end is grounded.

9. The converter according to claim 1, wherein the switch controller comprises a timer, when the control signal is converted from low level to high level, the timer is activated, and after a predetermined period of time, the timer enables the control signal to be converted to low level from high, the timer comprises:
a comparer for receiving a reference voltage and a time-varying signal, and then outputting the control signal;
a timing capacitor for outputting the time-varying signal;
a discharge circuit, which enables the timing capacitor to be discharged according to the synchronization signal; and
a charge circuit, which enables the timing capacitor to be charged according to the synchronization signal.

10. The converter according to claim 9, wherein the discharge circuit comprises:
a discharge transistor comprising a first end, a second end and a controlling end, wherein the controlling end operates according to the synchronization signal then determines whether the first end and the second end of the discharge transistor are turned on or not, of which, the first end of the discharge transistor is coupled to the capacitor, while the second end of the discharge transistor is grounded;
a fourth diode whose positive end is coupled to the output end of the synchronization signal generator;
a fifth diode whose positive end is grounded and whose negative end is coupled to the positive end of the fourth diode;
a voltage division circuit whose input end is coupled to the negative end of the fourth diode and whose output end is coupled to the controlling end of the discharge transistor; and
a second capacitor coupled between the output end of the synchronization signal generator and the positive end of the fourth diode.

11. The converter according to claim 9, wherein the charge circuit comprises:
a charge resistor whose one end receives a voltage while the other end is coupled to the timing capacitor.

12. The converter according to claim 9, wherein the timer further comprises:
an output resistor coupled between the output end of the comparer and the ground; and
an output capacitor connected in parallel with the output resistor.

13. The converter according to claim 1, wherein the charge storage unit is a capacitor.

14. A switching power converter for receiving an AC power and then outputting a DC power, the converter comprising:
a transformer comprising a primary side coil and a secondary side coil, wherein the primary side coil generates an induced voltage at the secondary side coil according to the AC power;
a charge storage unit coupled to the secondary side coil, wherein the charge storage unit is charged according to the induced voltage and then outputs the DC power;
a synchronization signal generator generating a synchronization signal according to the induced voltage, wherein when the induced voltage is positive, the synchronization signal is a first value, while when the induced voltage is negative, the synchronization signal is a second value; and
a switch element serially connected to the secondary side coil and controlled by the synchronization signal, wherein when the synchronization signal is the first value, the switch element is turned on and is turned off when otherwise.

15. The converter according to claim 14 further comprises a diode connected in parallel with the switch element.

16. The converter according to claim 14, wherein the secondary side coil further comprises an accessory coil having a first end and a second end, which is a grounding end, the synchronization signal generator generates the synchronization signal according to an accessory signal outputted by the accessory coil.

17. The converter according to claim 16, wherein the synchronization signal generator further comprises a clamp circuit for clamping the outputted synchronization signal.

18. The converter according to claim 17, wherein the clamp circuit is a zenor diode coupled between the output end and the grounding end of the synchronization signal generator.

19. The converter according to claim 17, wherein the synchronization signal generator comprises a positive half cycle processing circuit for processing the positive half cycle of the accessory signal, the positive half cycle processing circuit comprising:

a first diode whose positive end is coupled to the first end of the accessory coil and whose negative end is coupled to the output end of the synchronization signal generator;

a first capacitor whose first end is coupled to the output end of the synchronization signal generator;

a first resistor whose first end is coupled to the negative end of the first diode and whose second end is coupled to the first end of the first capacitor; and a second resistor coupled between the negative end of the first diode and the second end of the first capacitor.

20. The converter according to claim 19, wherein the synchronization signal generator further comprises a negative half cycle processing circuit for processing the negative half cycle of the accessory signal, the negative half cycle processing circuit comprises:

a second diode coupled between the first capacitor and the first resistor, wherein the positive end of the second diode is coupled to the first capacitor and the negative end of the second diode is coupled to the first resistor;

a third resistor connected in parallel with the second diode; and a third diode whose negative end is coupled to the negative end of the second diode and whose positive end is grounded.

* * * * *